US012617552B2

(12) United States Patent
Modrzewski et al.

(10) Patent No.: US 12,617,552 B2
(45) Date of Patent: May 5, 2026

(54) EARTH MONITORING SYSTEM AND METHOD OF MANAGING A SATELLITE CONSTELLATION

(71) Applicant: ICEYE OY, Espoo (FI)

(72) Inventors: Rafal Modrzewski, Espoo (FI); Pekka Laurila, Espoo (FI); Ignacio Chechile, Espoo (FI)

(73) Assignee: ICEYE OY, Espoo (FI)

( * ) Notice: Subject to any disclaimer, the term of this patent is extended or adjusted under 35 U.S.C. 154(b) by 0 days.

(21) Appl. No.: 18/693,559

(22) PCT Filed: Sep. 23, 2022

(86) PCT No.: PCT/EP2022/076590
§ 371 (c)(1),
(2) Date: Mar. 20, 2024

(87) PCT Pub. No.: WO2023/052270
PCT Pub. Date: Apr. 6, 2023

(65) Prior Publication Data
US 2024/0327038 A1     Oct. 3, 2024

(30) Foreign Application Priority Data

Sep. 29, 2021     (GB) ..................................... 2113949

(51) Int. Cl.
| | |
|---|---|
| *B64G 1/10* | (2006.01) |
| *B64G 3/00* | (2006.01) |
| *G01S 13/90* | (2006.01) |

(52) U.S. Cl.
CPC ......... *B64G 1/1035* (2023.08); *B64G 1/1085* (2013.01); *B64G 3/00* (2013.01); *G01S 13/90* (2013.01)

(58) Field of Classification Search
CPC ...... B64G 1/1035; B64G 1/1085; B64G 3/00; G01S 13/90
See application file for complete search history.

(56) References Cited

U.S. PATENT DOCUMENTS

| | | | |
|---|---|---|---|
| 9,857,475 | B2 | 1/2018 | Yunck |
| 2010/0063733 | A1 | 3/2010 | Yunck |

(Continued)

FOREIGN PATENT DOCUMENTS

| | | |
|---|---|---|
| BR | 112018072637 A2 | 2/2019 |
| BR | 112018072637 B1 | 6/2021 |

(Continued)

OTHER PUBLICATIONS

PCT Written Opinion and Search Report for related PCT/EP2022/076590 dated Dec. 6, 2022.

(Continued)

*Primary Examiner* — Timothy A Brainard
(74) *Attorney, Agent, or Firm* — Cozen O'Connor

(57) ABSTRACT

An Earth monitoring system comprises a satellite constellation (310) and a schedule calculation module (302) located on Earth. The schedule calculation module (302) may be configured to implement a satellite management method receiving a request post-launch for a location to be imaged; recalculating an existing schedule of the satellites to provide an updated schedule that includes imaging the location; and providing the updated schedule for transmission to one or more of the satellites.

25 Claims, 13 Drawing Sheets

(56) References Cited

U.S. PATENT DOCUMENTS

| | | | | |
|---|---|---|---|---|
| 2014/0039963 | A1 | 2/2014 | Augenstein et al. | |
| 2016/0306824 | A1* | 10/2016 | Lopez | G06F 16/738 |
| 2017/0146664 | A1* | 5/2017 | Kanner | H04B 7/18513 |
| 2017/0341778 | A1* | 11/2017 | Augenstein | G06F 9/3887 |
| 2018/0034536 | A1* | 2/2018 | Trutna | H04B 7/18521 |
| 2018/0270761 | A1* | 9/2018 | Garcia | H04B 7/18543 |
| 2019/0064318 | A1 | 2/2019 | Laurila | |
| 2020/0007224 | A1 | 1/2020 | Hawthorne et al. | |
| 2020/0018844 | A1* | 1/2020 | Fridman | G08G 3/02 |
| 2020/0348412 | A1* | 11/2020 | Durham | H01Q 21/28 |
| 2020/0349488 | A1* | 11/2020 | Augenstein | B64G 1/1085 |
| 2021/0011148 | A1 | 1/2021 | Blondel et al. | |
| 2021/0036767 | A1 | 2/2021 | Devaraj | |
| 2021/0036772 | A1* | 2/2021 | Miranda | H04B 7/18513 |
| 2022/0004950 | A1* | 1/2022 | Cribbs, III | G06Q 10/06312 |

FOREIGN PATENT DOCUMENTS

| | | | | |
|---|---|---|---|---|
| CA | 2897803 | A1 | 8/2014 | |
| CN | 1486545 | A | 3/2004 | |
| CN | 101692128 | A | 4/2010 | |
| CN | 104885104 | A | 9/2015 | |
| CN | 109714097 | A | 5/2019 | |
| CN | 110221297 | A | 9/2019 | |
| CN | 113179122 | A | 7/2021 | |
| EP | 3 182 700 | A1 | 6/2017 | |
| WO | WO-03040653 | A1 * | 5/2003 | G01C 11/02 |
| WO | 2020250707 | A1 | 12/2020 | |
| WO | 2021/022253 | A1 | 2/2021 | |

OTHER PUBLICATIONS

Office Action for KR 10-2024-7010798 dated Oct. 6, 2024. 3 pages (English translation not available).

Examination Report for AU 2022356212 dated May 31, 2024, 4 pages.

Examination Report for EP 22 777 251.4 dated Mar. 26, 2025, 5 pages.

Brazilian Office Action issued in connection with related Brazil Patent Application No. BR 112024005907-3 dated Sep. 2, 2024.

Chinese Office Action issued in connection with related Chinese Patent Application No. 202280066507.X dated Nov. 23, 2024.

Chinese Second Examination Opinion Notice issued in connection with related Chinese Patent Application No. 202280066507.X (with English translation), dated Apr. 18, 2025, 12 pages.

Third Chinese Office Action issued in connection with related Chinese Patent Application No. 202280066507.X dated Sep. 13, 2025, 7 pages.

Bianchessi Nicola, et al. "Planning and scheduling algorithms for the COSMO-SkyMed constellation", Aerospace Science and Technology 12 (2008) 535-544.

Hongrae Kim, et al. "Mission scheduling optimization of SAR satellite constellation for minimizing system response time", Aerospace Science and Technology 40 (2015) 17-32.

Junqi Lu, et al. "High-power efficiency aperiodic phased array antenna for space-borne SAR". 12 IET Microw. Antennas Progag. 649 (2018).

Opponent's statement of claims with Machine Translation dated Oct. 30, 2025, 57 pages.

* cited by examiner

Coverage on Earth of a single satellite path in 24 hours

Coverage on Earth of 18 (or similar) satellite path in 3 hours - (18 sat 3 h)

Coverage on Earth of 18 (or similar) satellite path in 24 hours

810 — 18 sat, 3 days, Tokyo

| Anx | Area covered (814/816) | Duration (818) | End (820) | Intersection Area (822) | Length (824) | Look Angle (826) | Pass (828) | Satellite (830) | Sensor (832) |
|---|---|---|---|---|---|---|---|---|---|
| 2018-Mar-21 12:35:55 126 | 100.00% | 10 | 2018-Mar-21 15:45:23 304 | 538.5975266 | 71.73651146 | 14.61405682 | ASCENDING | ICEYE X1 | LEFT |
| 2018-Mar-22 01:07:13 387 | 60.44% | 10 | 2018-Mar-22 01:44:48 865 | 325.5071074 | 71.77465319 | 28.88282264 | DESCENDING | ICEYE X1 | LEFT |

812 — 18 sat, 3 days, Tokyo

| Anx | Area covered | Duration | End | Intersection Area | Length | Look Angle | Pass | Satellite | Sensor |
|---|---|---|---|---|---|---|---|---|---|
| 2018-Mar-21 04:51:51 719 | 100.00% | 10 | 2018-Mar-21 05:01:08 872 | 538.5975266 | 71.9710091 | 28.10745154 | ASCENDING | ICEYE-BLOCK1.1.2 | RIGHT |
| 2018-Mar-21 12:35:06 235 | 100.00% | 10 | 2018-Mar-21 12:44:31 142 | 538.5975266 | 72.1399719 | 17.41635605 | ASCENDING | ICEYE-BLOCK1.2.2 | LEFT |
| 2018-Mar-22 01:02:02 195 | 100.00% | 10 | 2018-Mar-22 01:39:27 300 | 538.5975266 | 72.1482228 | 21.86044642 | DESCENDING | ICEYE-BLOCK1.2.2 | LEFT |
| 2018-Mar-20 18:50:34 751 | 100.00% | 10 | 2018-Mar-20 18:59:52 455 | 538.5975266 | 71.99196903 | 24.77364605 | ASCENDING | ICEYE-BLOCK1.3.1 | RIGHT |
| 2018-Mar-23 08:45:16 705 | 100.00% | 10 | 2018-Mar-23 09:22:49 779 | 538.5975266 | 72.00237178 | 23.90022439 | DESCENDING | ICEYE-BLOCK1.3.2 | RIGHT |
| 2018-Mar-21 08:04:24 627 | 100.00% | 10 | 2018-Mar-21 08:39:56 291 | 538.5975266 | 68.97210287 | 26.05651117 | DESCENDING | ICEYE-BLOCK2.1.1 | LEFT |
| 2018-Mar-22 07:22:25 911 | 97.90% | 10 | 2018-Mar-22 07:57:10 526 | 527.3001139 | 68.84656088 | 16.41429236 | DESCENDING | ICEYE-BLOCK2.1.1 | RIGHT |
| 2018-Mar-23 07:27:03 249 | 8.27% | 10 | 2018-Mar-23 08:02:48 316 | 44.55641461 | 68.97019709 | 34.85790584 | DESCENDING | ICEYE-BLOCK2.12 | LEFT |
| 2018-Mar-21 15:50:24 730 | 28.18% | 10 | 2018-Mar-21 16:24:41 163 | 151.7990464 | 68.94738041 | 15.41032965 | DESCENDING | ICEYE-BLOCK2.2.1 | LEFT |
| 2018-Mar-21 08:04:24 383 | 100.00% | 10 | 2018-Mar-21 08:15:48 887 | 538.5975266 | 68.95037568 | 19.0414597 | ASCENDING | ICEYE-BLOCK2.2.1 | LEFT |
| 2018-Mar-22 15:08:25 767 | 100.00% | 10 | 2018-Mar-22 15:42:54 194 | 538.5975266 | 68.76267414 | 27.00367841 | DESCENDING | ICEYE-BLOCK2.2.1 | RIGHT |
| 2018-Mar-21 08:09:01 458 | 100.00% | 10 | 2018-Mar-21 08:21:28 529 | 538.5975266 | 68.70824211 | 32.85757276 | ASCENDING | ICEYE-BLOCK2.2.2 | RIGHT |
| 2018-Mar-20 15:45:47 669 | 4.31% | 10 | 2018-Mar-20 16:20:01 142 | 23.21514483 | 68.69908692 | 34.90591326 | DESCENDING | ICEYE-BLOCK2.2.2 | RIGHT |
| 2018-Mar-21 15:50:27 714 | 100.00% | 10 | 2018-Mar-21 16:01:36 097 | 538.5975266 | 68.9693602 | 31.32051391 | ASCENDING | ICEYE-BLOCK2.3.1 | LEFT |
| 2018-Mar-22 15:55:04 889 | 100.00% | 10 | 2018-Mar-22 16:07:14 541 | 538.5975266 | 68.80687266 | 21.78590351 | ASCENDING | ICEYE-BLOCK2.3.2 | RIGHT |

| | |
|---|---|
| Request ground station availability | ~1302 |
| Receive new order | ~1303 |
| Recalculate execution sets | ~1304 |
| Recalculate schedule | ~1306 |
| Update ground station bookings | ~1308 |
| Upload new schedule | ~1310 |
| Provide delivery parameters to customer | ~1312 |
| Execute order | ~1314 |

Hardware view

*1400*

*1402*      *1404*      *1406*

*1408*           *1410*

EARTH MONITORING SYSTEM AND METHOD OF MANAGING A SATELLITE CONSTELLATION

This application is the National Stage filing under 35 U.S.C. 371 of International Application No. PCT/EP2022/076590 filed on 23 Sep. 2022, which claims priority to GB Application No. 2113949.8 filed on 29 Sep. 2021, the contents of both of which are hereby incorporated by reference herein in their entirety to the extent permitted by law.

The present application relates to a system and method for Earth observation using a constellation of satellites, and a system for managing and tasking the satellite constellation to acquire images for a range of Earth observation applications.

BACKGROUND

Many land and maritime monitoring applications require information to be delivered within a few hours or less due to the nature of the events being monitored. For example, this may be required in ship identification and tracking applications used for detecting unauthorised shipping activities where information is required on a fast enough timescale to enable prompt intervention. However, Earth observation satellites for monitoring typically do not return images on such short timescales after a new order is submitted. Instead, it is typical for Earth observation satellites to be tasked before launch such that the mission is predefined. This creates problems for responding to real-time monitoring needs.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter.

The present disclosure provides a method of managing a constellation of satellites that may be performed at ground control, to accommodate a post-launch request for a location to be imaged. Aspects of some implementations include the identification of execution sets for imaging locations, selecting an optimum execution set and accommodating changes to the satellite constellation.

In a first aspect, the present disclosure provides a method of managing a constellation of earth observation satellites each comprising a synthetic aperture radar for imaging the earth, the method comprising: receiving a request post-launch to acquire an image of a location; identifying, from the constellation of satellites, qualifying satellites whose paths enable imaging of the location within a time window; for each qualifying satellite, identifying one or more execution sets, each execution set comprising the qualifying satellite and a communication channel for communicating with the qualifying satellite, and at least one of the execution sets comprising one or more further qualifying satellites for imaging the location using more than one satellite; recalculating an existing schedule of the satellites to provide an updated schedule that includes imaging the location; and providing the updated schedule for transmission to one or more of the satellites.

The method may include any of the below described features in any combination.

The constellation of satellites may store the existing schedule. The method may comprise selecting an execution set for imaging the location.

The method may comprise simulating satellite paths to identify the qualifying satellites. Ground station availability data may be used to identify the communication channels of the execution sets. The ground station availability data may be retrieved from a ground station provider.

One or more of the communication channels may comprise an uplink and a downlink that use different ground stations. One or more of the communication channels may comprise space to space communication.

Each execution set may be capable of downlinking an image of the location within a predetermined time.

The method may comprise selecting an optimum execution set for imaging the location. The method may comprise minimising an order turn around time. The method may comprise minimising a difference between a requested imaging time and a scheduled imaging time.

Determining an optimum execution set may comprise optimising the updated schedule of the constellation of satellites. Optimising the updated schedule may comprise optimising a distribution of utilisation across the constellation of satellites.

Optimising the updated schedule may comprise allocating tasks to the constellation of satellites according to their respective capabilities.

Optimising the updated schedule may comprise predicting data communication traffic and optimising the updated schedule based on the prediction. For example prediction may use historic traffic data, for example using machine learning.

The optimising the updated schedule may comprise rescheduling a task previously scheduled in the existing schedule. The method may comprise rescheduling the previously scheduled task only if a predetermined duration remains before it is due to be executed. The method may comprise rescheduling a previously scheduled task only if agreed service levels can still be met.

The method may comprise booking ground station services from a ground station provider according to the updated constellation schedule. The method may comprise transmitting the updated schedule to one or more of the satellites. The method may comprise receiving an image of the location from one or more satellite of the constellation of satellites.

The method may comprise recalculating the updated schedule to provide an adjusted schedule in response to unavailability of one of the satellites, and providing the adjusted schedule for transmission to one or more of the satellites.

The method may comprise recalculating the updated schedule to provide an adjusted schedule in response to unavailability of a ground station, and providing the adjusted schedule for transmission to one or more of the satellites.

The method may comprise recalculating the updated schedule to provide an adjusted schedule in response to an addition of a satellite to the constellation of satellites, and providing the adjusted schedule for transmission to one or more of the satellites.

There is also provided here a schedule calculation module configured to implement any of the methods described here.

There is also provided here an Earth monitoring system comprising a satellite constellation and a schedule calculation module located on Earth, wherein the schedule calculation module is configured to receive a request post-launch for a location to be imaged, to recalculate an existing schedule for the constellation of satellites to provide an updated schedule that includes imaging the location, and to provide the updated schedule for transmission to one or more of the satellites.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

Thus in another aspect there is provided a computer readable medium comprising instructions which, when implemented in a processor in a schedule calculation module, cause the schedule calculation module to perform any of the methods described here.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 8B is a pair of tables showing acquisition opportunities to acquire an image of Tokyo in respective scenarios having one and 18 Earth observation satellites respectively;

Figure 1:
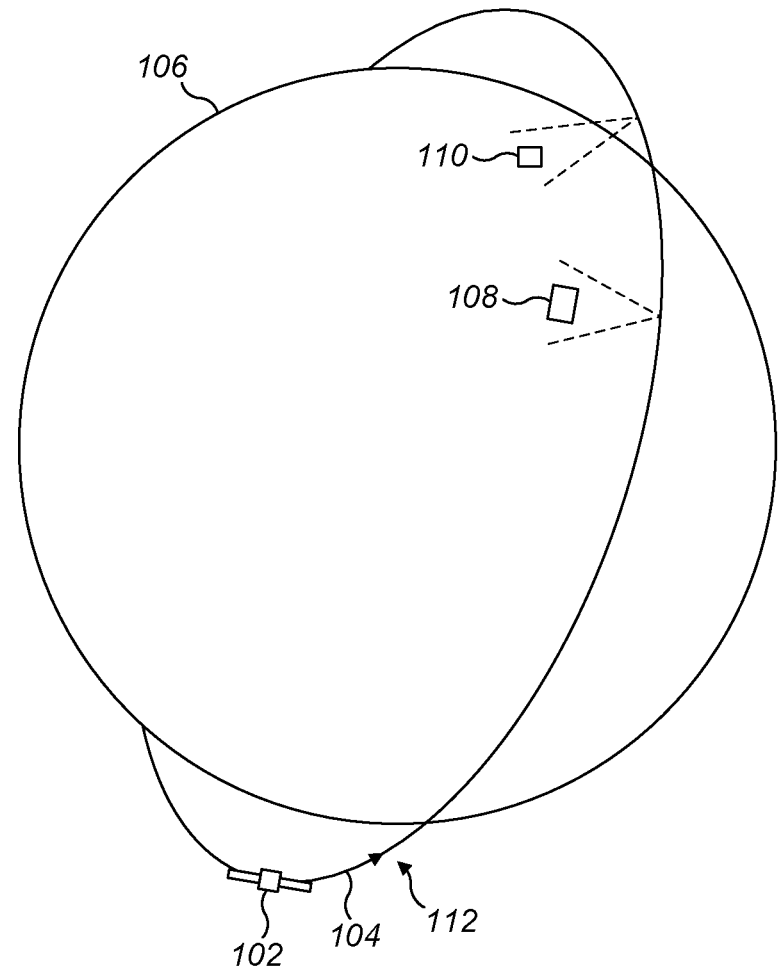
FIG. 1 is a perspective view of the Earth and a satellite.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 illustrates a satellite 102 in an orbit 104 around the Earth 106. The satellite's trajectory includes passing over a location 108 to be imaged by the satellite 102 and a ground station 110 configured to communicate data to and from the satellite 102. A new order to acquire an image of the location 108 may be submitted to a ground control station 110 after the satellite 102 is launched. In this case, the tasking of the order must be communicated to the satellite 102 via an uplink from Earth. FIG. 1 shows a single ground station. In a practical implementation, multiple ground stations are spread around Earth and may be used by many customers to communicate with their satellites. Once an order to "book" time at a ground station is sent, the ground station crew will typically need time to queue up the required transmission for either uplinking or downlinking.

In an example, the satellite 102 is orbiting Earth in a low-earth orbit. A low-earth orbit can be from 160 km to 1000 km above the surface of the Earth. Examples of Earth-monitoring satellites can have orbits of between 450 km and 650 km above the Earth. In some embodiments, a satellite has an orbit that is approximately 550 km above the Earth's surface. At an orbit of 550 km above the Earth, for example, the satellite is effectively traversing the ground at about 7.5 km/s, or 27,000 km/h. Most satellites in this this orbit will traverse the Earth at a speed that is in the range of 7-8 km/s.

In an example, satellite 102 uses synthetic aperture radar "SAR" to image the Earth in all sorts of conditions, including through cloud, fog, smoke, and at night. Satellite 102 can also used reflectors or phased-array antennas to help direct the synthetic aperture radar beam. In any of the constellations described here, one or a plurality or each of the satellites may use SAR.

Various classes of satellites are currently in orbit around the earth, generally defined by ranges of weights, although the boundaries between the classes are somewhat fluid and arbitrary:

Cube satellites: 1 kg-10 kg

Micro satellites: 50 kg-to 250 kg

Small satellites: 500 kg

Regular satellites: 800-1200 kg.

Smaller satellites are less expensive to launch and as such can be more readily used to create a satellite constellation with broad coverage of the Earth's surface. For example, having more satellites in the constellation can provide many more options and significantly reduced time between images for monitoring of a particular area or feature on Earth. However, very small cube satellites do not at present have the capability to carry a current SAR payload. Heavier satellites are generally more expensive and less agile. Embodiments of the satellite constellation and operating methods described here have been successfully trialed using micro satellites between 50 kg and 250 kg.

In the example of FIG. 1, the uplink to a satellite 102 in low-earth orbit is provided by the ground station 110. As the satellite 102 moves along its orbit 104 in the direction shown by arrow 112, it first passes over the location 108 and then passes over the ground station 110. As a result, in this example the new order cannot be uplinked to the satellite 102 before its next pass over the location 108 to be imaged. This builds a delay into the process. When the satellite 102 passes over the ground station 110, the order is uplinked by being transmitted from the ground station 110 to the satellite. Next time the satellite 102 passes over the location 108 the image can be acquired.

There may be a considerable amount of time before the satellite 102 next passes over the location 108. When the satellite 102 has completed a full orbit, the Earth 106 will have rotated through a small angle so the satellite will no long pass directly over the location 108. The Earth 106 may need to undergo several full rotations (taking several days) before the satellite 102 passes over the location 108 again and is able to acquire an image.

Figure 2:
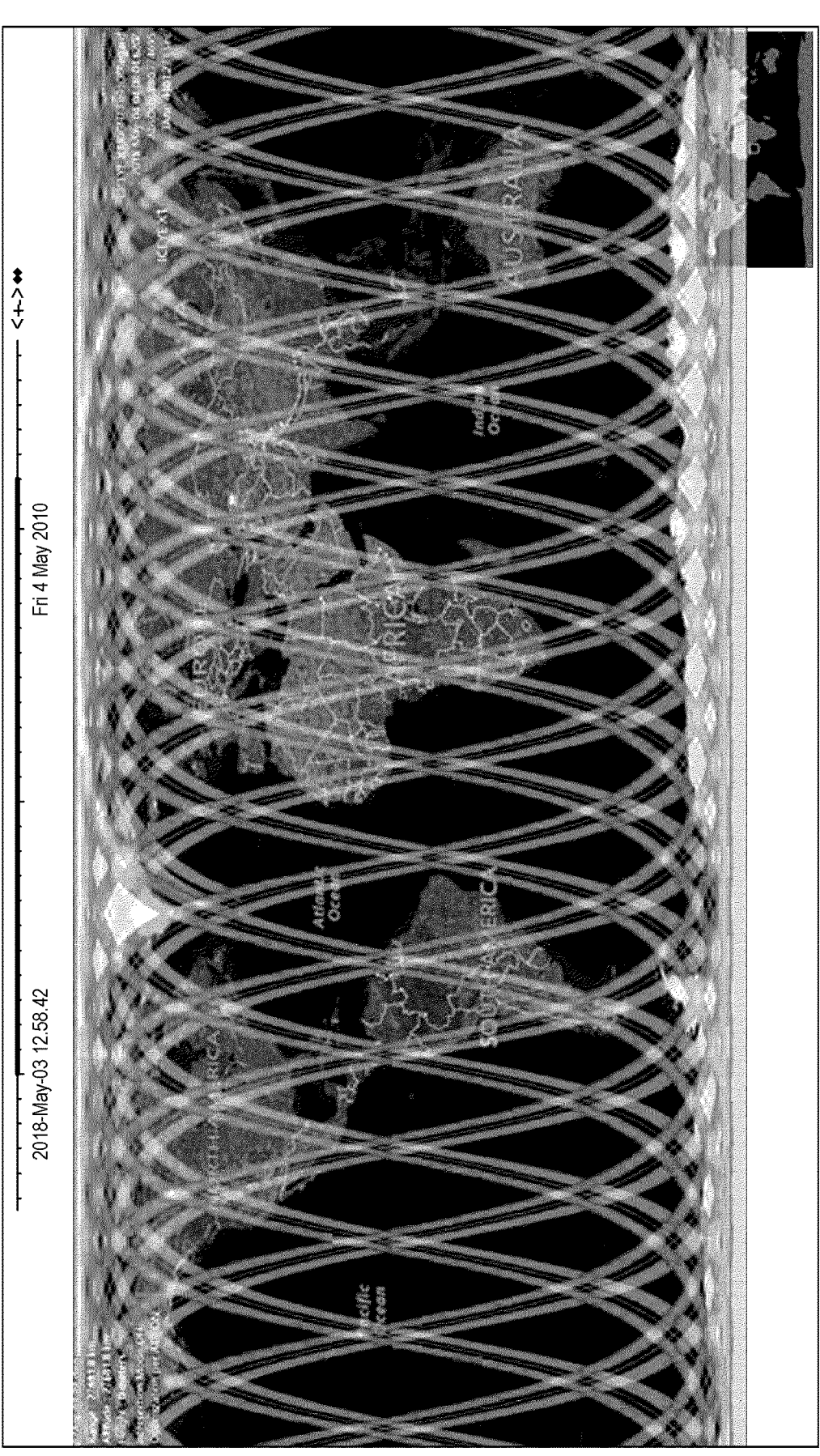
FIG. 2 is a map of the Earth showing coverage of one satellite in 24 hours.

This can be readily appreciated from the coverage map illustrated in FIG. 2 which shows the coverage on Earth of a satellite path in 24 hours. Well under half the Earth is covered in 24 hours, indicating that it may take several days to provide a complete coverage and for the satellite 102 of FIG. 1 to pass directly over the location 108 again to acquire the requested image. This scenario can easily contribute around a week in the delay between submitting the new order and delivering the image.

In the example of FIG. 1, after eventually passing the location 108 for a second time after the new order was submitted, the satellite 102 will shortly thereafter pass over the ground station 110 to downlink the captured image. Once received by the ground station 110, the image can be delivered to an end user and/or processed to extract other usable information such as land monitoring parameters for delivery to the end user.

As a result of the time lag of up to a week or more that can occur between order submission and delivery, Earth observation satellites are typically not used for applications that require faster response times such as hours or minutes. Instead, it is typical for Earth observation missions to be predefined before launch to provide specific images of predetermined events or to provide continuous known performance such as regular monitoring of known locations that can be scheduled in advance.

If it is attempted to add an additional order to a pre-existing schedule after launch, the additional order will be subject to the possible delays described above of up to a week, and furthermore it will be necessary to fit the tasking of the additional order into gaps in the existing schedule which is likely not only to exacerbate delays but also to result in an inefficient use of overall resources in the mission.

Figure 3:
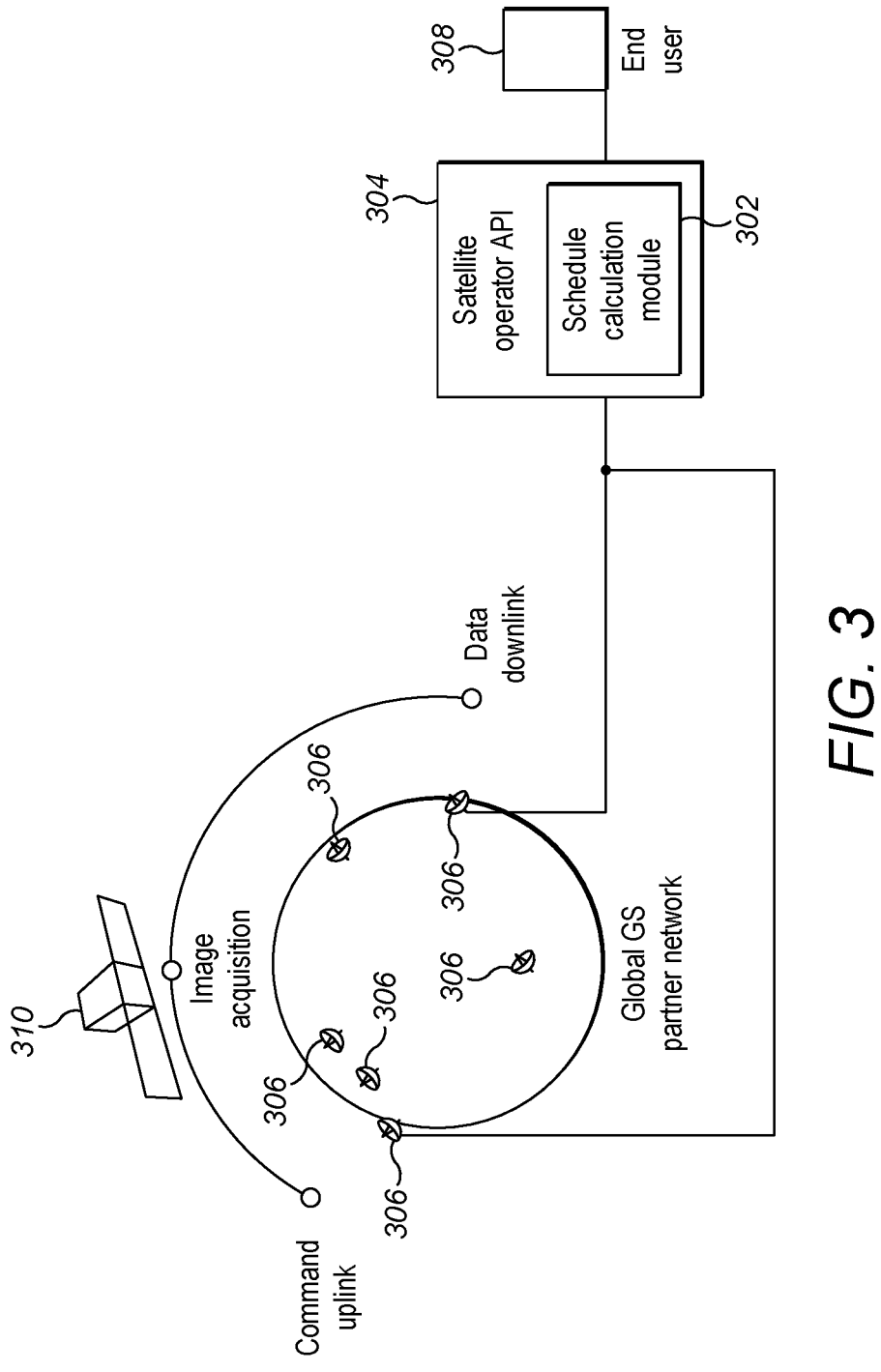
FIG. 3 is a schematic diagram of the Earth, an example satellite, and a system for managing a constellation of satellites.

Using another approach, it is possible to improve delivery times for new orders and to use resources efficiently. Referring to FIG. 3, a system for managing a constellation of satellites includes a schedule calculation module 302 for calculating a schedule for a constellation of satellites to execute tasks. The schedule calculation module 302 may be provided in a satellite operator application programming interface (API) 304 that is configured to communicate with a network of ground stations 306 and an end user 308. The ground stations 306 provide uplinks and downlinks to communicate to and from satellite 310 of the set. (A representative satellite 310 of the set is shown in FIG. 3. Other satellites of the set are not shown in this figure but the set may include several or more satellites 310, each of which is configured to communicate with the ground stations 306.)

The schedule calculation module and/or the API in which it is comprised in a computing system as is known in the art of APIs. The computing system may be distributed across multiple locations or at a single location on Earth. For example the schedule calculation module 302 may be located at a ground station, or at another location in communication with multiple ground stations.

Figure 4:
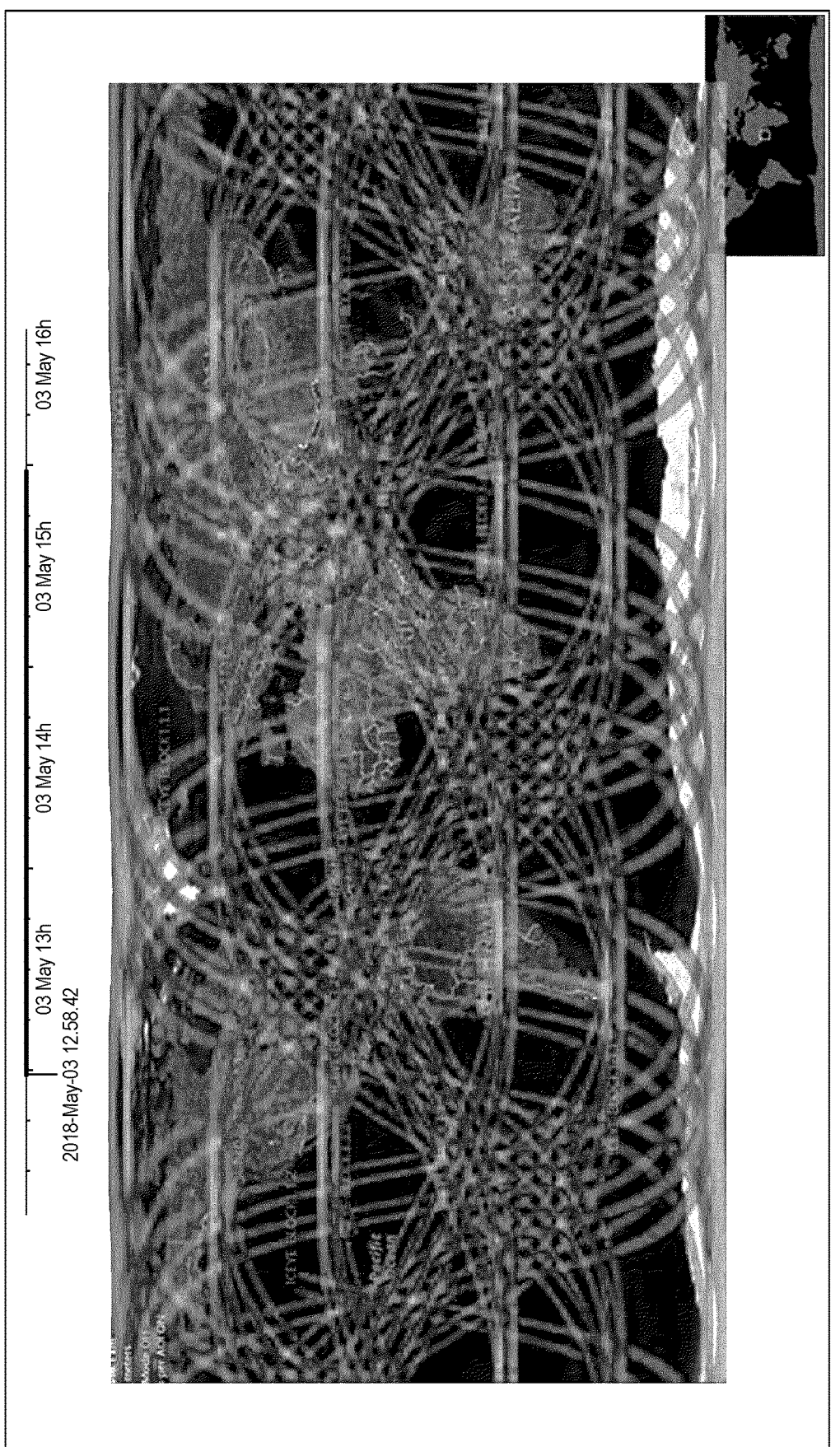
FIG. 4 is a map of the Earth showing coverage of 18 satellites in 3 hours.
Figure 5:
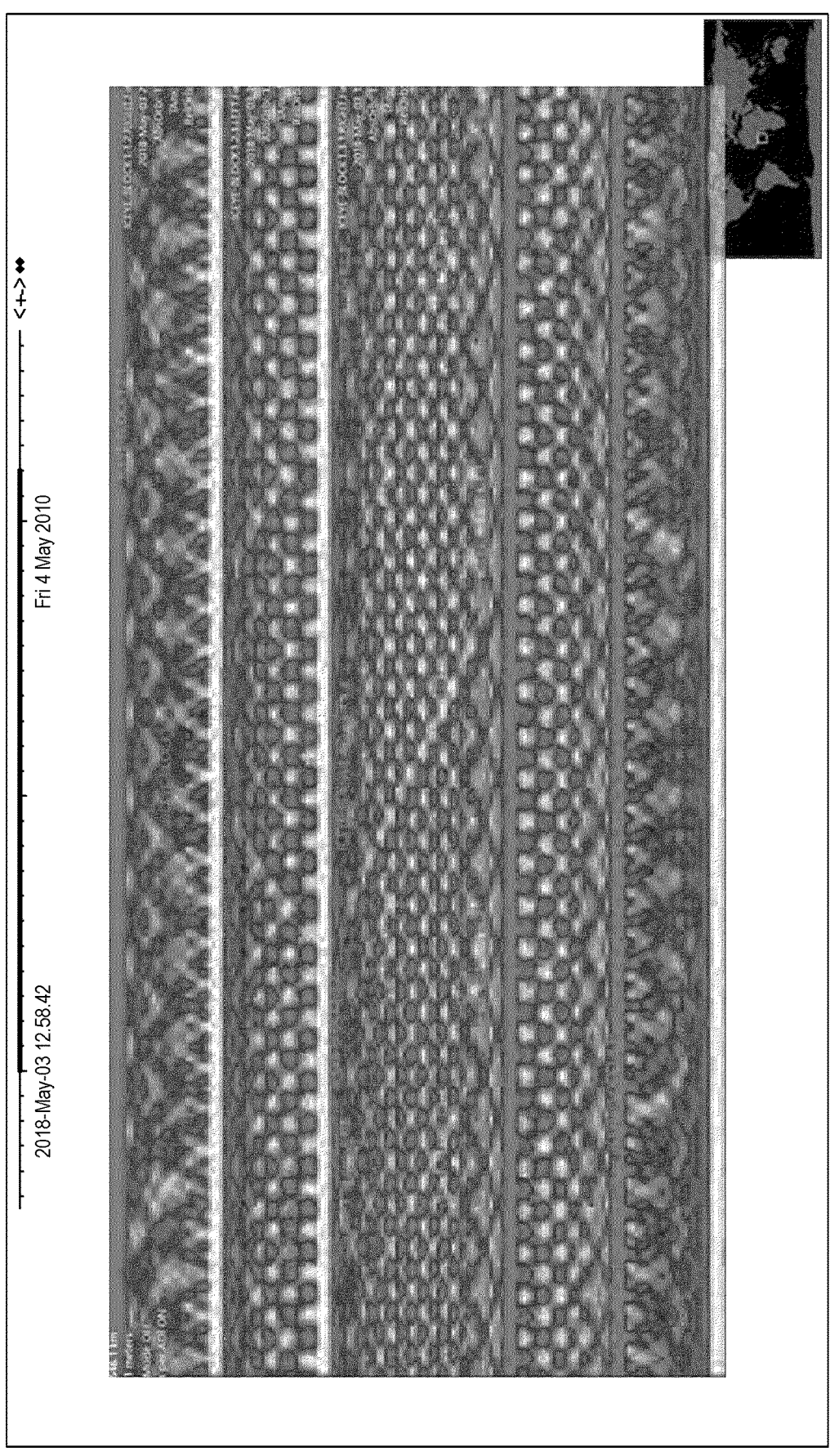
FIG. 5 is a map of the Earth showing coverage of 18 satellites in 24 hours.

By using a constellation of satellites, for example a constellation of 18 satellites, the overall coverage of Earth by the set in a given time period is improved. Consequently, the delays caused by waiting for a satellite to pass over a location to be imaged are reduced. This can be appreciated by referring to the maps shown in FIGS. 4 and 5. FIG. 4 shows a map of the coverage on Earth of 18 satellite paths in 3 hours, and FIG. 5 shows the coverage on Earth of the same 18 satellites in 24 hours. Substantially complete coverage of the Earth is achieved in 24 hours, unlike the coverage situation with a single Earth observation satellite shown in FIG. 2.

The larger the number of satellites in the satellite constellation, the better the overall coverage of Earth by the satellite constellation in a given time period (i.e., reduced time between successive images of the same area or feature on Earth). For example, having two or more satellites will already provide significantly increased coverage compared to having just one satellite in the constellation. Three or more satellites would provide even better coverage, as would five or more satellites, or twelve or more satellites. Eighteen or more satellites as described in this example provides exceptional coverage. Even a satellite constellation with five or more satellites can achieve repeat times (time between possible successive images of one area or feature on Earth) previously unheard of in Earth monitoring. However, as the number of satellites in the satellite constellation increases, the complexity of scheduling, optimization, and tasking all of the satellites to do their assigned tasks post-launch increases exponentially. In an example, a system with a schedule calculation module and supporting databases are used to handle these complex processing and tasking activities.

The schedule calculation module 302 shown in FIG. 3 actively manages the tasking of the launched satellites 310 as new orders are received. When a new order is received, a schedule of the whole constellation of satellites is recalculated so that the overall tasking can be kept efficient while incorporating the new task with an acceptable delivery time. This approach enables turn-around times of a few hours or less for orders submitted post-launch.

Figure 6:
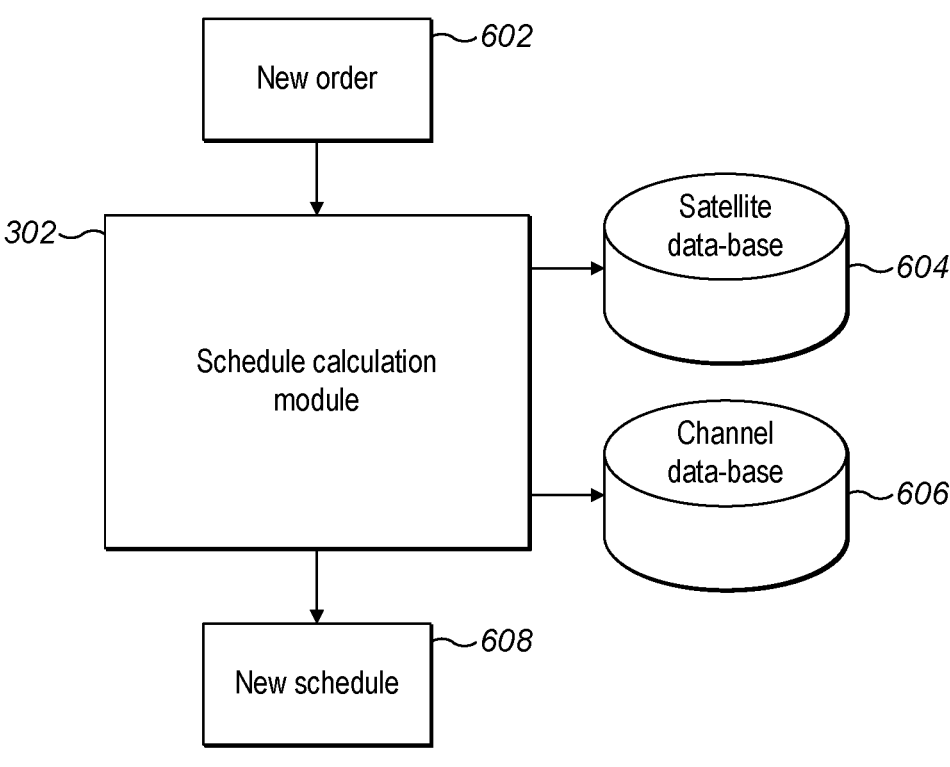
FIG. 6 is a schematic diagram of a schedule calculation module of the above system, a satellite database, and a channel database.

The schedule calculation module 302 is shown in FIG. 6 in relation to a new order 602, a satellite database 604, a channel database 606, and a new schedule 608. The schedule calculation module 302, a satellite database 604, a channel database 606 may form part of a ground control station or satellite operator API, and together function to calculate a new schedule 608 every time a new order 602 is received. The schedule calculation module 302 is configured to recalculate the schedule using data from the satellite database 604 and the channel database 606 which store data such as satellite paths, satellite availability, ground station locations and availability, and available communication channels between the satellites and the ground stations. Details of these data and how they are used are described below.

Figure 7:
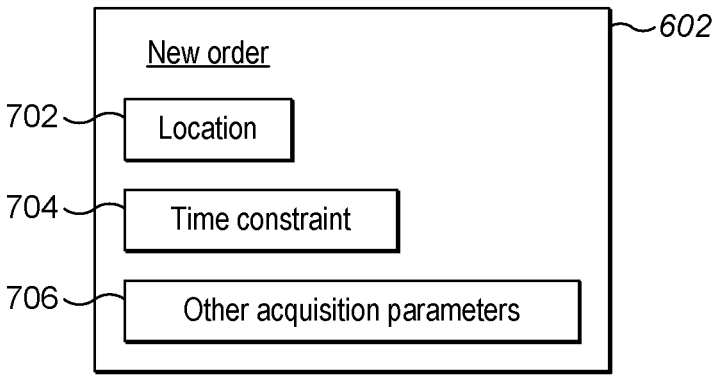
FIG. 7 is a schematic diagram of an order for an image of a location.

Referring to FIG. 7, a new order 602 generally defines one or more geographical locations to be imaged and a time requirement for when the one or more images are acquired. The time requirement may, for example, be that the images are required immediately or as soon as possible, or may comprise one or more periods of time in the future during which images should be taken. Typical orders may require images to be taken regular time intervals, for example daily. Other acquisition parameters may also be stipulated in an order. For example a customer may wish to specify the mode of acquisition such as 'spotlight' or 'stripmap'—these give tradeoffs between resolution and area covered (spotlight giving a higher resolution at the expense of a smaller area covered, stripmap the reverse). This may depend on any desired further processing that they would wish to do with an image (for example, object classification, change detection, etc). As such, referring to FIG. 7, the new order 602 may comprise any of an indication of a location 702, a time constraint 704, and any other acquisition parameters 706 in any combination.

Figure 8A:
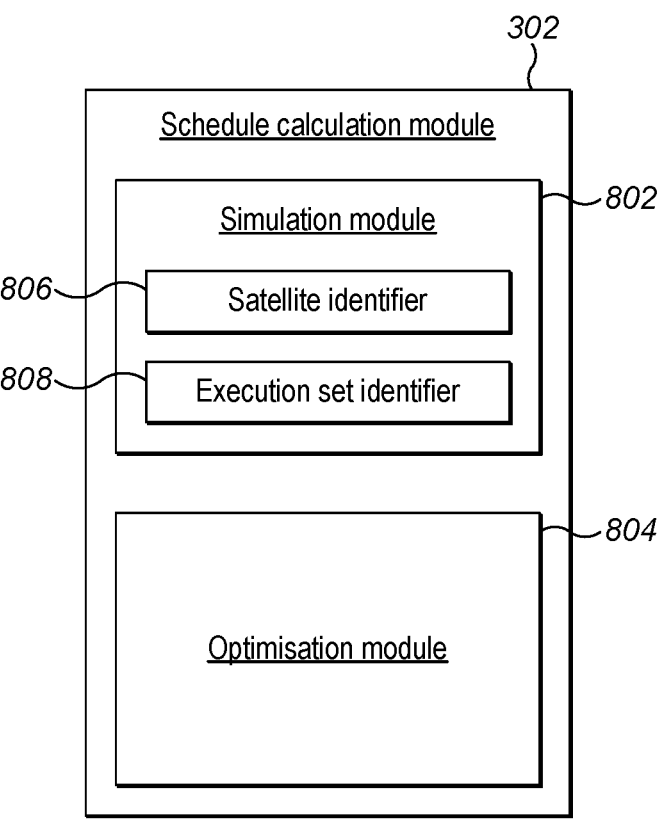
FIG. 8A is a schematic diagram showing details of the above schedule calculation module.

Every time a new order 602 is received, the schedule calculation module 302 calculates an updated schedule for the satellites that includes imaging the one or more locations defined in the new order 602. In order to achieve this, the schedule calculation module may comprise, as shown in FIG. 8A, a simulation module 802 configured to determine options for how the schedule can be updated to accommodate the new order 602, and an optimisation module 804 configured to determine a suitable updated schedule based on the available options.

The simulation module 802 comprises a satellite identifier 806 configured to identify satellites that, based on their orbital positions and projected paths, can acquire the requested images. The requested images include the ones that have been requested in the new order 602 as well as the ones that have been requested in previous orders and have not yet been acquired. The satellites that can acquire the images are the ones whose paths take them over the requested locations in accordance with the time constraints specified in the orders. In order to identify which satellites can execute which orders, the satellite identifier 806 may be configured to run a simulation of the satellite paths to determine which satellites will be passing over the relevant geographical locations next. It will be appreciated that an arbitrary acquisition may not be executed perfectly, but the satellite identifier is looking for satellites that would be able to match an arbitrary order to a location within a reasonable threshold of the specified time constraints whilst maintaining the other acquisition parameters as well as possible.

Referring to FIG. 8B, the satellite identifier 806 may generate a table of acquisition opportunities for acquiring an image of a location such as Tokyo. In a first example scenario, there is one imaging satellite and the satellite identifier 806 generates a first table 810 detailing the possible opportunities to acquire an image of Tokyo using the one satellite during a three day period. In a second example scenario, there are 18 satellites and the satellite identifier generates a second table 812 detailing the possible opportunities to acquire an image of Tokyo using one or more of the 18 satellites during a three day period.

As shown, the first table 810 has two rows, each representing an opportunity to acquire an image of Tokyo during the three days. There are two opportunities because, although there is only one satellite, it passes over Tokyo twice during the three days. Details of each acquisition opportunity are provided in the respective rows of the table 810. In a first column 'Anx' 814, a coordinated universal time, also known as a universal time coordinated and abbreviated as UTC, is indicated. This provides a time stamp of the acquisition showing the date and time the image would be acquired. A second column 'AreaCovered' 816 indicates the percentage of the requested area that would be imaged in that acquisition. In a third column 'Duration' 818, a duration in seconds is indicated showing how long the satellite's imaging instrument would be on for to capture the image. This is 10 seconds in this example. A fourth column 'End' 820 indicates the date and time when the imaging instrument would complete the imaging—the end of the 10 second period. In a fifth column 'IntersectionArea' 822, the overlap in square kilometres between the requested area to be imaged and the actual area that would be imaged is indicated. A sixth column 'Length' 824 indicated the distance as projected onto the ground that the satellite would cover during the 10 second imaging operation. In a seventh column 'LookAngle' 826 a tilt of the imaging instrument on a roll axis is indicated in degrees. An eighth column 'Pass' 828 indicates whether the imaging satellite would be travelling towards the north pole (ascending) or towards the south pole (descending) as projected onto the Earth's surface when the imaging would take place. In a ninth column 'Satellite' 830, the identity of the satellite is indicated. In the scenario of table 810 there is only one satellite so both rows indicate the same satellite. Finally, a tenth column 'Sensor' 832 indicates whether a left or right sensor of the satellite would perform the imaging. The table 812 relating to the second example scenario has similar columns and shows acquisition opportunities using one or more of 18 satellites in a 3-day period. There are 15 rows, representing 15 acquisition opportunities during the three days. As shown in the ninth column 'Satellite', some rows indicate the same satellite, showing that some satellites pass over Tokyo more than once during the three days. For example, the second and third rows both relate to image acquisition by the satellite 'ICEYE-BLOCK1.2.2'. In total, 10 of the 18 satellites pass over Tokyo in the three days once or more, providing the 15 acquisition opportunities shown in table 812.

Returning to FIG. 8A, the simulation module 802 also comprises an execution set identifier 808 configured to identify ground stations to complete the order. Ground stations are required to uplink new schedules to the satellites and to downlink image data or data derived from the images from the satellites. Thus, for each image to be acquired, the execution set identifier 808 is configured to identify one or more execution sets, each execution set comprising a satellite, a ground station that can provide an uplink and a ground station that can provide a downlink. By identifying the execution sets, the simulation module 802 generates a set of options of how the orders can be executed. For example, in the case of the table 810 of FIG. 8B, each row representing a potential acquisition may be associated with five ground stations providing uplink options in the 90 minutes before acquisition and five ground stations providing downlink options in the 90 minutes after acquisition. As a result, for each possible acquisition (i.e. for each row in the table 810), there may be 5×5=25 execution sets. Since there are two potential acquisitions, there could be 2×25=50 possible execution sets to acquire an image of Tokyo in this scenario. In general, a suitable execution set for each image to be acquired needs to be selected from among the available options. For example, a suitable selection of execution sets may provide efficient use of resources across the satellites and ground stations, and may also execute the new order within an acceptable delivery time.

In order to make a suitable selection of execution sets, the schedule calculation module 302 comprises an optimisation module 804 configured to determine an optimised set of execution sets. The optimisation module 804 attempts to match the orders to the execution capabilities that are available, and may be configured to optimise for delivery time, efficient use of satellite and ground station resources, and cost-effectiveness.

Figure 9:
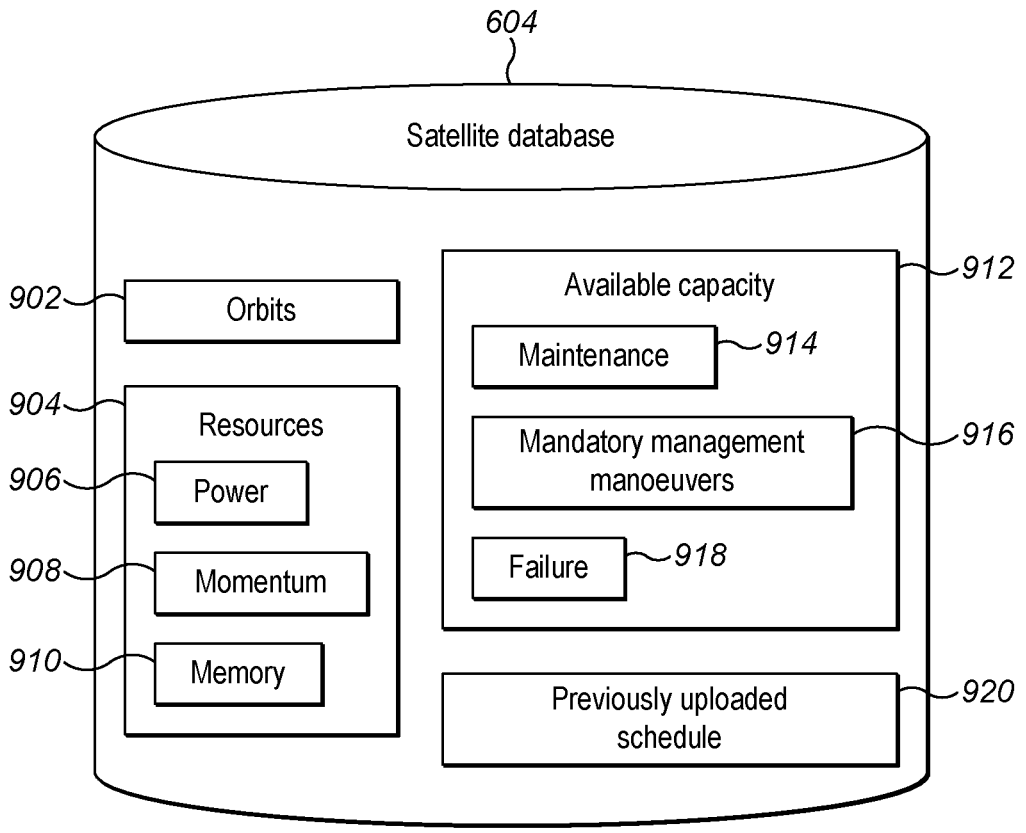
FIG. 9 is a schematic diagram showing details of the above satellite database.

In order to identify satellites and execution sets, the simulation module is communicatively connected to a satellite database 604 and a channel database 606. As shown in FIG. 9, the satellite database 604 stores satellite data such as satellite orbits 902, satellite resources 904 such as power 906, momentum 908 and memory 910, available capacity 912 including data on reductions in capacity due to satellite maintenance 914, satellite mandatory management manoeuvres 916 and satellite failures 918, and a previously uploaded schedule 920. In examples, the satellite database 604, or another database that the schedule calculation module 302 has access to, may store business rules that may also be used to determine a new schedule.

Figure 10:
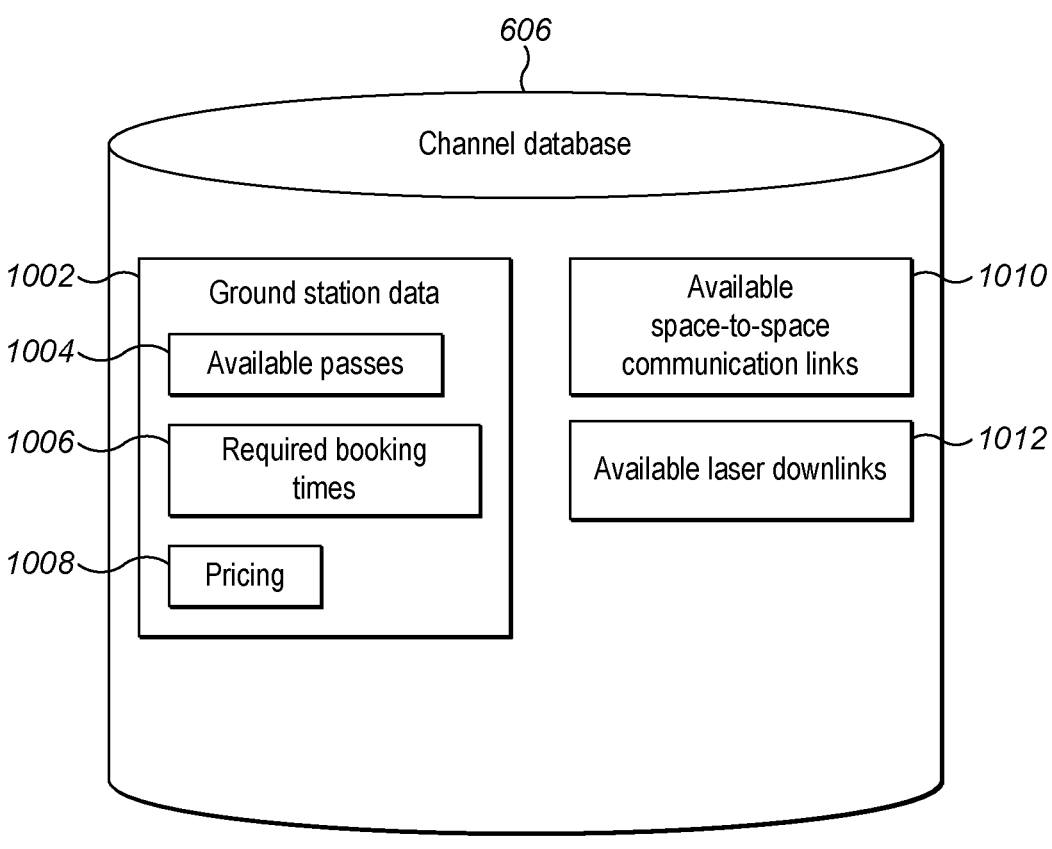
FIG. 10 is a schematic diagram showing details of the above channel database.

As shown in FIG. 10, the channel database 606 stores channel data (relating to communication channels to and from satellites) such as ground station data 1002 including available passes 1004, for example passes when the ground station has capacity to up/downlink or other measure of availability, required booking times 1006, for example minimum time between booking the ground station and up/downlinking or other measure of booking time, and pricing 1008, available space-to-space communication links 1010, and available laser downlinks 1012. The space-to-space communication links may be provided by other satellites such as geostationary satellites, other spacecraft.

The simulation module 802 of the schedule calculation module 302 uses data in the satellite database 604 and the channel database 606 to determine the execution sets that can be used to acquire images.

Figure 11:
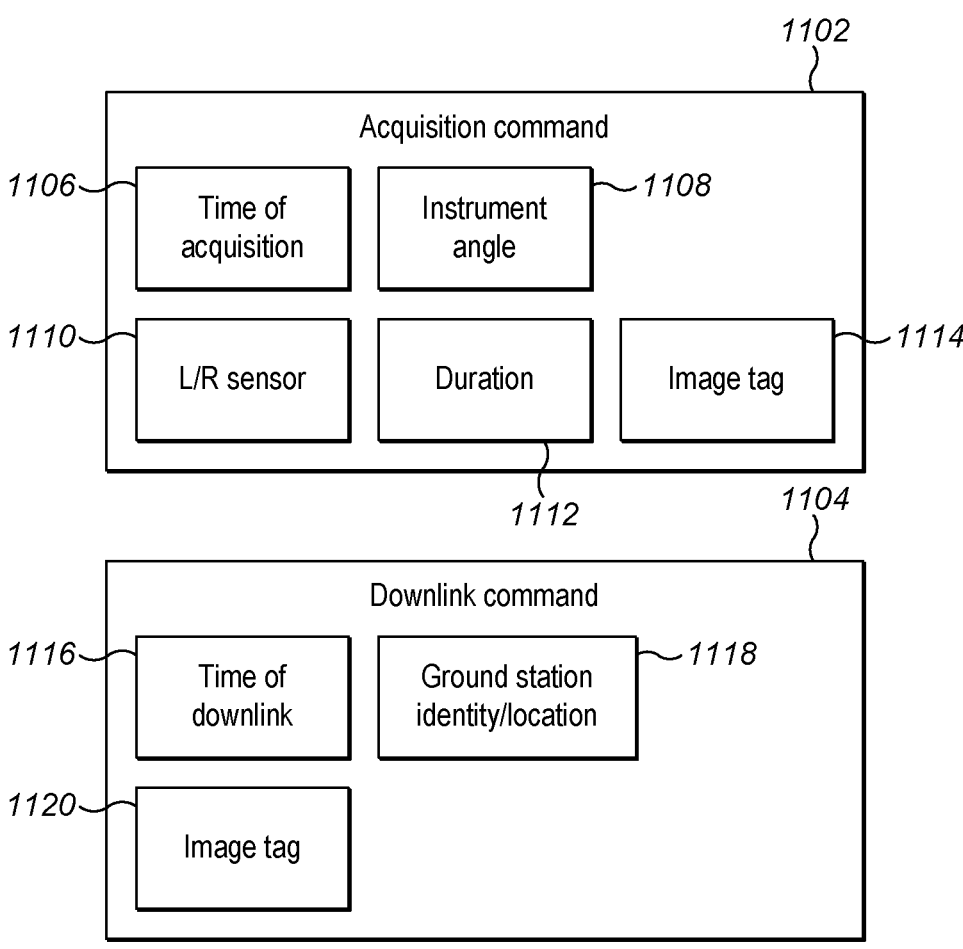
FIG. 11 is a schematic diagram showing schedule information to be uploaded to a constellation of satellites.

Referring to FIG. 11, when a schedule has been calculated, schedule information is uploaded to the set of satellites to instruct them to acquire and downlink image data. In an embodiment, the schedule information comprises an acquisition command 1102 providing details of when and how to perform the imaging operation and a downlink command 1104 comprising details of when and how to downlink the acquired data. There is no uplink command because it will be appreciated that the satellite is configured to receive an uplinked signal without being commanded to do so.

The acquisition command 1102 may comprise an indication 1106 of the time the image is to be acquired, an indication 1108 of the angle of the imaging instrument on a roll axis, an indication 1110 of whether a left or right sensor is to be used for the imaging, an indication of a duration 1112 of the imaging operation (for example 10 seconds as the example above), and an indication 1114 of an image tag. An image tag provides an identifier such as a name or alphanumerical identifier for the image so that it can be identified easily when it is to be downlinked.

The downlink command 1104 may comprise an indication 1116 of the time of the downlink, an indication 1118 of the identity or location of the ground station to which the image is to be downlinked, and an indication 1120 of the image tag. This facilitates the process of identifying the correct image at the scheduled time of the downlink.

Figure 12:
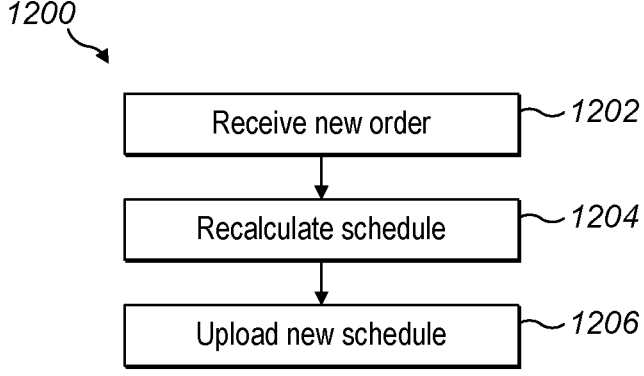
FIG. 12 is a flow chart showing a method for managing a constellation of satellites.

Referring to FIG. 12, a method 1200 of managing satellites comprises receiving 1202 a new order, recalculating 1204 a schedule 1204, and uploading 1206 the new schedule to the satellites. The method 1200 may suitably be performed by a combination of a satellite operator API and a ground station providing an uplink to a satellite.

Figure 13:
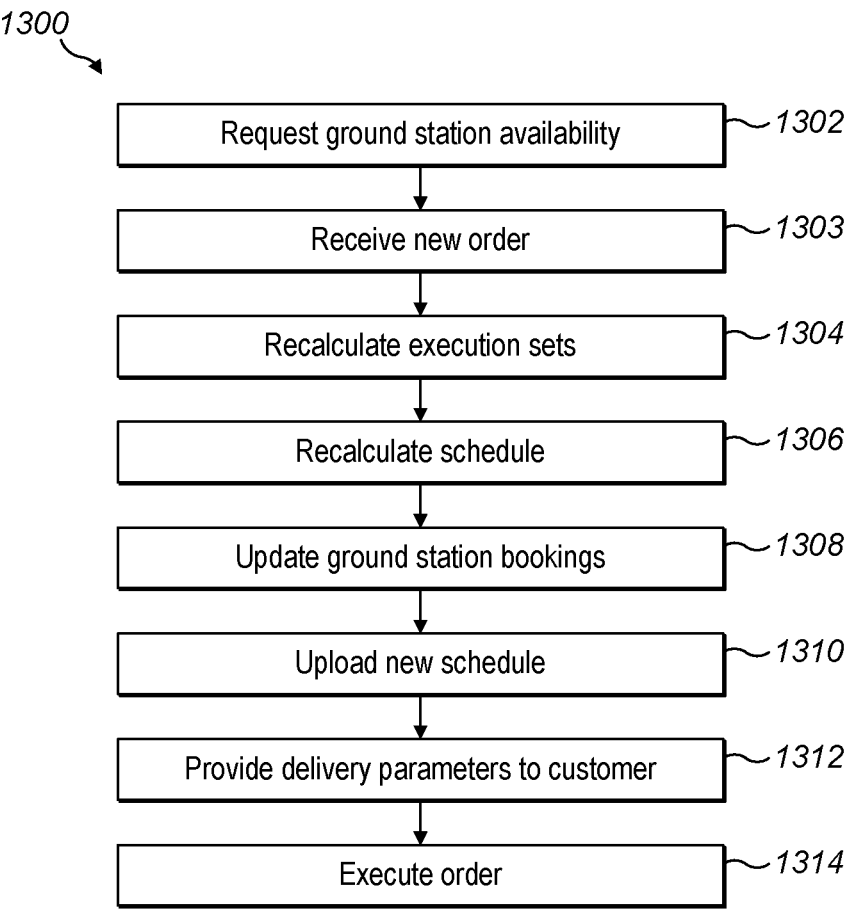
FIG. 13 is a flow chart showing an example implementation of the above method.

FIG. 13 shows a worked example 1300 of how a satellite operator can manage a constellation of satellites using the apparatus of FIGS. 6, 8, 9 and 10. In order to recalculate the schedule of satellite tasks each time a new order is submitted, the schedule calculation module 302 requires up to date information on available resources. These include data on the satellites and data on the ground stations so that execution sets can be identified and selected from. As such, the data stored in the satellite database 604 and the channel database 606 are kept up to date. Satellite data, such as orbits 902, power 906 and momentum 908, are within the satellite operator's control and known to the satellite operator. As a result, these data can be kept up to date by the satellite operator without any reliance on external providers. However, if the satellite operator uses an external ground station provider, then the ground station data 1002 stored in the channel database 606 has to be sourced from the ground station provider regularly to keep this information up to date. As such, the worked example includes the step of requesting 1302 ground station availability from a ground station provider.

The schedule calculation module receives a new order 602 at step 1303. At this stage, ways in which the pending orders can be executed need to be identified. (The pending orders comprise both the new order and any previously received orders that are still to be executed. In the case that there are no previous orders waiting to be executed, the schedule recalculation step is the same and simply comprises calculating a new schedule.) Each order may contain the same parameters and resource allocation. In order to identify possible ways to execute the pending orders, the schedule calculation module 302 recalculates possible execution sets for each order at step 1304. This creates options from which a new execution set for each pending order can be selected. The schedule is then recalculated at step 1306 by selecting a suitable execution set for each order, and generating a new schedule for the satellites on the basis of the selected execution sets. Execution sets may be selected on the basis of meeting optimisation goals such as minimising delivery time, minimising a difference between a requested image acquisition time and an actual image acquisition time, maximising efficiency of use of resources across the satellites, and minimising cost. A table of resource allocation may be updated at this stage. The resource allocation table may contain information relevant to a particular implementation and may include any one or more of:

Which satellite would be performing the order
  Storage available on the satellite for imaging tasks
  The amount of time a satellite is imaging (executing orders) in a particular orbit, this is limited by power availability (battery capacity) and thermal parameters
  Which downlink pass over a ground station would be used to transfer the image.

In order to implement the new schedule, ground station bookings are updated at step 1308 to match the new execution sets and provide the uplinks and downlinks that are required by the new schedule. This may involve requesting new bookings and cancelling redundant ones, and requires communicating with the ground station provider to change the booking. The new schedule is uploaded to the satellites at step 1310, or at least to affected satellites that are tasked differently in the new schedule compared to the old schedule. The uploading is implemented using ground stations reserved in the updated ground station booking. At this stage, the ground stations and satellites are ready to execute the orders according to the new schedule, and the delivery parameters, can be provided at step 1312 to the customer. Delivery parameters may comprise any one or more of time of image acquisition; time of delivery; where the image will be sent to, such as the address of the customer's Secure File Transfer Protocol (SFTP) server, or if they will access it from services of the constellation operator; what level of processing the customer requires, e.g. Ground Range Detected (the image is registered to the globe)/Single Look Complex whereby the actual I/Q values of the reflected signal are supplied.

At step 1314 the new order is executed, involving acquiring the required image or images and downlinking the image data or suitable data derived from the images for delivery to the customer.

The schedule is recalculated every time a new order is received or another event that affects capacity to execute orders takes place. For example, events that would affect capacity to execute orders may include maintenance of a satellite or ground station, or failure of a satellite or ground station.

The present disclosure provides various advantages for managing satellites. From the point of view of the customer who submits an order, there is an improved turn-around time between submitting an order and receiving a requested satellite image. This means that urgent images can be acquired and delivered faster than using traditional methods. From the point of view of the satellite operator, since the schedule is recalculated each time a new order is received, the available satellites and their resources can be used more efficiently and more cost-effectively when new orders arrive. Tip and cue refers to the process of monitoring an area or an object of interest by a sensor and requesting "tipping" another complementary sensor platform to acquire "cueing" an image over the same area. Typically, the process of tip and cue is initiated with an object or location identified with a cost-effective, low resolution (but wide field-of-view) sensor. The information collected is then passed to a higher resolution (and potentially more costly) sensor for follow-up investigation and analysis.

Some embodiments of the invention enable satellites with different capabilities to be easily accommodated, and a new schedule can be calculated to provide efficient use of satellite resources, taking into account the different capabilities of different satellites. Two main reasons for satellites having different capabilities are firstly simple evolution, as satellites launched more recently will typically be 'better' with more storage, more robust manufacturing techniques, more sophisticated radios for both downlink and imaging, more accurate pointing systems etc.; and secondly degradation in space-satellites are prone to high levels of solar/cosmic radiation, which can damage subsystems which can then limit their abilities to function. The distribution and timing of this across a fleet or constellation is effectively random. Further, different satellites may have different imaging capabilities, such as resolution capability, use different wavelengths for imaging, or better processing and storage capability.

Ground stations and their resources may also be used more efficiently. The present approach is also less susceptible to failures because in the event an asset such as a satellite or a ground station fails, the schedule is recalculated and the pending orders are accommodated as efficiently as possible using the remaining assets and their resources. This is much better than a failure of a satellite or ground station resulting in orders not being able to be executed.

Figure 14:
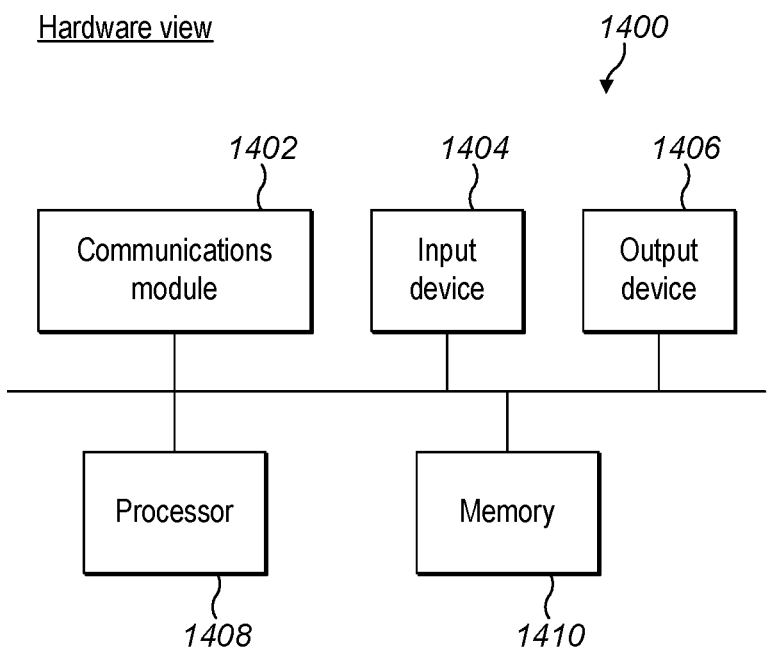
FIG. 14 is a schematic diagram of hardware suitable for implementing the above schedule calculation module.

FIG. 14 shows a system 1400 suitable for implementing a method of processing a new order according to the present disclosure. The system 1400 comprises a communications module 1402, an input device 1404, an output device 1406, a processor 1408 and memory 1410. For example, the processor 1408 may be configured to recalculate a schedule for satellites by running a computer program stored in the memory 1410.

In the embodiment described above the server may comprise a single server or network of servers. In some examples the functionality of the server may be provided by a network of servers distributed across a geographical area, such as a worldwide distributed network of servers, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

Although illustrated as a single system, it is to be understood that the computing device may be a distributed system. Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed is:

1. A method of managing a constellation of Earth observation satellites at ground control, each satellite comprising a synthetic aperture radar for imaging Earth, the method comprising:

receiving a request post-launch to image a location on a surface of Earth;

identifying, from the constellation of satellites, qualifying satellites whose paths enable imaging of the location within a time window;

for each qualifying satellite, identifying one or more execution sets, each execution set comprising the qualifying satellite, a ground station for providing an uplink and a ground station for providing a down link for communicating with the qualifying satellite, and at least one of the execution sets comprising:

one or more further qualifying satellites for imaging the location using more than one satellite; and respective ground stations for providing an uplink and respective ground stations for providing a downlink for communication with the one or more further qualifying satellites;

identifying an optimum execution set for imaging the location within the time window;

recalculating an existing schedule of the satellites to provide an updated schedule that includes imaging the location using the optimum execution set; and transmitting the updated schedule to one or more of the satellites to image the location identified in the request.

2. The method of claim 1, wherein the constellation of satellites stores the existing schedule.

3. The method of claim 1 comprising simulating satellite paths to identify the qualifying satellites.

4. The method of claim 1, comprising selecting an execution set for imaging the location.

5. The method of claim 1, comprising using ground station availability data retrieved from a ground station provider to identify the ground station for providing an uplink or the ground station for providing a down link.

6. The method of claim 1, wherein the ground station for providing an uplink and the ground station for providing a down link are different ground stations.

7. The method of claim 1, wherein communicating with the qualifying satellite comprises space to space communication.

8. The method of claim 1, wherein each execution set is capable of downlinking an image of the location within a predetermined time.

9. The method of claim 1, wherein identifying an optimum execution set comprises minimising an order turn around time or a difference between a requested imaging time and a scheduled imaging time.

10. The method of claim 1, wherein determining an optimum execution set comprises optimising the updated schedule of the constellation of satellites.

11. The method of claim 10, wherein optimising the updated schedule comprises optimising a distribution of utilisation across the constellation of satellites, allocating tasks to the constellation of satellites according to their respective capabilities, or predicting data communication traffic and optimising the updated schedule based on the prediction.

12. The method of claim 10, wherein optimising the updated schedule comprises rescheduling a task previously scheduled in the existing schedule only if a predetermined duration remains before it is due to be executed or if agreed service levels can still be met.

13. The method of claim 1, comprising booking ground station services from a ground station provider according to the updated constellation schedule.

14. The method of claim 1, comprising receiving an image of the location from one or more of the constellation of satellites.

15. The method of claim 1, comprising recalculating the updated schedule to provide an adjusted schedule in response to unavailability of one of the satellites, and providing the adjusted schedule for transmission to one or more of the satellites.

16. The method of claim 1, comprising recalculating the updated schedule to provide an adjusted schedule in response to unavailability of a scheduled ground station, and providing the adjusted schedule for transmission to one or more of the satellites.

17. The method of claim 1, comprising recalculating the updated schedule to provide an adjusted schedule in response to an addition of a satellite to the constellation of satellites, and providing the adjusted schedule for transmission to one or more of the satellites.

18. A schedule calculation module with a processor and a non-transitory computer readable medium storing instructions which, when executed by the processor cause the schedule calculation module to perform the method of claim 1.

19. A non-transitory computer readable storage medium with processor executable instructions stored thereon which, when executed by a processor in a schedule calculation module, causes cause the schedule calculation module to perform a method of managing a constellation of Earth observation satellites at ground control, each satellite comprising a synthetic aperture radar for imaging Earth, wherein the method comprises:

receiving a request post-launch to image a location;

identifying, from the constellation of satellites, qualifying satellites whose paths enable imaging of the location within a time window;

for each qualifying satellite, identifying one or more execution sets, each execution set comprising the qualifying satellite, a ground station for providing an uplink and a ground station for providing a down link for communicating with the qualifying satellite, and at least one of the execution sets comprising:

one or more further qualifying satellites for imaging the location using more than one satellite; and respective ground stations for providing an uplink and respective ground stations for providing a down link for communication with the one or more further qualifying satellites;

identifying an optimum execution set for imaging the location within the time window;

recalculating an existing schedule of the satellites to provide an updated schedule that includes imaging the location using the optimum execution set; and transmitting the updated schedule to one or more of the satellites to image the location identified in the request.

20. An Earth monitoring system comprising a satellite constellation, each satellite comprising a synthetic aperture radar for imaging Earth, and a schedule calculation module located on Earth, wherein the schedule calculation module is configured to:

receive a request post-launch to image a location and identify, from the constellation of satellites, qualifying satellites whose paths enable imaging of the location within a time window;

for each qualifying satellite, identify one or more execution sets, each execution set comprising the qualifying satellite, a ground station for providing an uplink and a ground station for providing a down link for communicating with the qualifying satellite, and at least one of the execution sets comprising:

one or more further qualifying satellites for imaging the location using more than one satellite; and respective ground stations for providing an uplink and respective ground stations for providing a down link for communication with the one or more further qualifying satellites;

identifying an optimum execution set for imaging the location within the time window;

recalculate an existing schedule for the satellites in the constellation to provide an updated schedule that includes imaging the location using the optimum execution set, and transmit the updated schedule to one or more of the satellites to image the location identified in the request.

21. The Earth monitoring system of claim 20 wherein the satellite constellation comprises satellites in low-earth orbit.

22. The Earth monitoring system of claim 20 wherein the synthetic aperture radar comprises a phased array antenna.

23. The Earth monitoring system of claim 20 wherein the satellite constellation comprises three or more satellites, or five or more satellites, or 8 or more satellites, or 12 or more satellites, or 18 or more satellites.

24. The Earth monitoring system of claim 20 wherein the satellite constellation comprises satellites that are less than 500 kg, or between 50 and 250 kg.

25. The Earth monitoring system of claim 20 wherein the one or more satellites comprise storage containing the existing schedule.

* * * * *